United States Patent
Naganuma et al.

(10) Patent No.: US 10,340,542 B2
(45) Date of Patent: Jul. 2, 2019

(54) FUEL CELL SYSTEM AND CONTROL METHOD OF FUEL CELL

(71) Applicant: TOYOTA JIDOSHA KABUSHIKI KAISHA, Toyota-shi, Aichi-ken (JP)

(72) Inventors: Yoshiaki Naganuma, Toyota (JP); Tomohiro Ogawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 187 days.

(21) Appl. No.: 15/188,313

(22) Filed: Jun. 21, 2016

(65) Prior Publication Data

US 2016/0380295 A1 Dec. 29, 2016

(30) Foreign Application Priority Data

Jun. 26, 2015 (JP) .................. 2015-128259

(51) Int. Cl.

| | |
|---|---|
| *H01M 8/04014* | (2016.01) |
| *H01M 8/04992* | (2016.01) |
| *H01M 8/04537* | (2016.01) |
| *H01M 8/0432* | (2016.01) |
| *H01M 8/04225* | (2016.01) |
| *H01M 8/04858* | (2016.01) |

(52) U.S. Cl.
CPC ... *H01M 8/04992* (2013.01); *H01M 8/04225* (2016.02); *H01M 8/04358* (2013.01); *H01M 8/04552* (2013.01); *H01M 8/04951* (2016.02); *H01M 2250/20* (2013.01); *Y02T 90/32* (2013.01)

(58) Field of Classification Search
CPC ............ H01M 8/04992; H01M 8/04225
USPC ............................................. 429/432
See application file for complete search history.

(56) References Cited

U.S. PATENT DOCUMENTS

| | | | | |
|---|---|---|---|---|
| 2005/0118481 | A1* | 6/2005 | Sakano | H01M 8/02 429/508 |
| 2007/0179636 | A1* | 8/2007 | Shige | B60L 11/1861 700/22 |
| 2008/0299428 | A1* | 12/2008 | Miyata | H01M 8/0432 429/430 |
| 2009/0110987 | A1 | 4/2009 | Kagami | |
| 2014/0011109 | A1* | 1/2014 | Katano | H01M 8/026 429/455 |
| 2014/0335433 | A1* | 11/2014 | Jomori | H01M 8/0488 429/432 |

FOREIGN PATENT DOCUMENTS

| | | |
|---|---|---|
| JP | 2005-183126 A | 7/2005 |
| JP | 2008-130444 A | 6/2008 |
| JP | 2008-300299 A | 12/2008 |

(Continued)

*Primary Examiner* — Abdullah A Riyami
*Assistant Examiner* — Nader J Alhawamdeh
(74) *Attorney, Agent, or Firm* — Finnegan, Henderson, Farabow, Garrett & Dunner, LLP

(57) ABSTRACT

An object is to readily provide an output limit of a fuel cell by using temperature of a cooling medium, while improving the startability of a fuel cell. When a cell voltage obtained from an end-portion cell of a fuel cell is equal to or lower than a first threshold value, a controller of a fuel cell system sets an output limit amount used for output limit of the fuel cell to be smaller than an output limit amount according to temperature of a cooling medium measured by a temperature measurement unit.

8 Claims, 7 Drawing Sheets

(56) References Cited

FOREIGN PATENT DOCUMENTS

| JP | 2009-099294 A | 5/2009 | | |
|----|----|----|----|----|
| JP | 2011-34837 | 2/2011 | | |
| JP | WO 2013080463 A1 * | 6/2013 | .......... | H01M 8/0488 |

* cited by examiner

FUEL CELL SYSTEM AND CONTROL METHOD OF FUEL CELL

CROSS-REFERENCE TO RELATED APPLICATIONS

The present application claims priority from Japanese patent application No. 2015-128259 filed on Jun. 26, 2015, the content of which is hereby incorporated by reference into this application.

BACKGROUND

The present invention relates to a fuel cell system.

A fuel cell has a stack structure with a plurality of stacked power generation elements as base units of power generation (hereinafter also called "cells"). A fuel cell system configured to include such a fuel cell is generally known. JP 201.1-034837A describes a method of starting a fuel cell system in a subzero environment.

At a start of the fuel cell system like the fuel cell system described in JP 2011-034837A, in the case of detection of a decrease in voltage of the fuel cell, the fuel cell system provides an output limit of the fuel cell, in order to suppress deterioration of the cells of the fuel cell. More specifically, the fuel cell system provides an upper limit of the electric current required for the fuel cell.

The cell is more likely to deteriorate by a decrease of the voltage at the higher temperature of the cell. Accordingly the fuel cell system increases the output limit amount of the fuel cell with an increase in temperature of the fuel cell. The temperature of a cooling medium used to cool down the fuel cell is used as an index indicating the temperature of the fuel cell. The temperature of the cooling medium is readily obtained by measuring the temperature of the cooling medium that is discharged from the fuel cell, with a temperature sensor. In the case of detection of a decrease in voltage of the fuel cell, the fuel cell system may provide an output limit of the fuel cell with the magnitude of an output limit amount according to the temperature of the cooling medium.

In the fuel cell having the plurality of cells, the temperatures of the respective cells of the fuel cell are not uniform. For example, end-portion cells that are located in an end portion of the stack structure are more likely to release heat and have the poorer temperature rise performance, so as to have the lower temperature, compared with center-portion cells that are located in a center portion of the stack structure. The temperature of the cooling medium is, however, the index indicating the temperature of the entire fuel cell. The output limit of the fuel cell using the output limit amount according to the temperature of the cooling medium accordingly results in providing an excessive output limit especially for the end-portion cells of the fuel cell. The excessive output limit is likely to reduce the amount of heat generated by the respective cells of the fuel cell and cause deterioration of the startability of the fuel cell.

There is accordingly a need for a fuel cell system that readily provides an output limit of a fuel cell by using temperature of a cooling medium, while improving the startability of the fuel cell.

SUMMARY

In order to solve at least part of the above problems, the invention may be implemented by any of the following aspects.

(1) According to one aspect of the invention, there is provided a fuel cell system. The fuel cell system comprises a fuel cell configured by stacking a plurality of cells; a cell monitor configured to measure voltage of each of the cells as a cell voltage; a temperature measurement unit configured to measure temperature of a cooling medium used to cool down the fuel cell; and a controller configured to provide an output limit of the fuel cell in response to a decrease of the cell voltage and determine an output limit amount for the output limit according to the temperature of the cooling medium measured by the temperature measurement unit. When the cell voltage obtained from an end-portion cell of the fuel cell is equal to or lower than a first threshold value, the controller sets an output limit amount used for the output limit to be smaller than the output limit amount according to the temperature of the cooling medium measured by the temperature measurement unit.

The output limit amount of the fuel cell has a positive correlation to the temperature of the fuel cell. More specifically, the higher temperature of the fuel cell provides the larger output limit amount, and the lower temperature of the fuel cell provides the smaller output limit amount. In the fuel cell having the plurality of cells, the temperatures of the respective cells of the fuel cell are not uniform. For example, the temperature in end-portion cells of the fuel cell is lower than the temperature in center-portion cells of the fuel cell. The temperature of the cooling medium generally used as an index indicating the temperature of the fuel cell is accordingly higher than the actual temperature of the end-portion cells of the fuel cell. Determining the output limit amount of the fuel cell according to the temperature of the cooling medium thus results in providing an excessive output limit for the end-portion cells of the fuel cell (i.e., providing an excessively large output limit amount). The excessive output limit is likely to reduce the amount of heat generated by the respective cells of the fuel cell and cause deterioration of the startability of the fuel cell. In the fuel cell system of this aspect, when the cell voltage obtained from the end-portion cells of the fuel cell is decreased, the controller reduces the output limit amount used for the actual output limit of the fuel cell to be smaller than the output limit amount according to the temperature of the cooling medium measured by the temperature measurement unit. The fuel cell system of this aspect accordingly prevents an excessive output limit from being provided for the end-portion cells of the fuel cell. This increases the amount of heat generated by the respective cells of the fuel cell and improves the startability of the fuel cell. As a result, the fuel cell system of this aspect readily provides the output limit of the fuel cell by using the temperature of the cooling medium, while improving the startability of the fuel cell.

(2) In the fuel cell system of the above aspect, the controller may determine the output limit amount used for the output limit when the cell voltage obtained from the end-portion cell of the fuel cell is equal to or lower than the first threshold value, according to a corrected temperature that is corrected to be lower than the temperature of the cooling medium measured by the temperature measurement unit.

In the fuel cell system of this aspect, the controller determines the output limit amount of the fuel cell according to the corrected temperature that is corrected to the lower temperature that fits the temperature of the end-portion cells of the fuel cell.

(3) In the fuel cell system of the above aspect, the controller may apply a primary delay element to correct the temperature.

In the fuel cell system of this aspect, the controller determines the corrected temperature by applying the primary delay element. The corrected temperature is accordingly lower than the temperature of the cooling medium measured by the temperature measurement unit for some time after a start of the fuel cell and subsequently becomes closer to the temperature of the cooling medium measured by the temperature measurement unit. As a result, the controller gives priority to increasing the amount of heat generated by the respective cells of the fuel cell and thereby improving the startability of the fuel cell for some time after a start of the fuel cell (for example, for some time until warm-up of the fuel cell), and after that (for example, after warm-up of the fuel cell), gives priority to suppressing deterioration of the cells.

(4) In the fuel cell system of the above aspect, the controller may apply a primary delay element to correct the temperature when the fuel cell system is being warmed up. After completion of warm-up of the fuel cell system, the controller may select a value that provides a larger amount of correction between a value by application of the primary delay element and a value determined according to an ambient temperature, to correct the temperature.

In the fuel cell system of this aspect, the controller determines the corrected temperature by applying the primary delay element when the fuel cell system is being warmed up. This configuration gives priority to increasing the amount of heat generated by the respective cells of the fuel cell and thereby improving the startability of the fuel cell when the fuel cell system is being warmed up. After completion of warm-up of the fuel cell system, the controller determines the corrected temperature by using the value that provides the larger amount of correction, i.e., the value that provides the lower corrected temperature, between the value by applying the primary delay element and the value determined according to the ambient temperature. This configuration suppresses deterioration of the cells, while improving the startability of the fuel cell as much as possible by taking into account the ambient temperature, after completion of warm-up of the fuel cell system.

(5) According to another aspect of the invention, there is provided a fuel cell system. The fuel cell system comprises a fuel cell configured by stacking a plurality of cells; a cell monitor configured to measure voltage of each of the cells as a cell voltage; a temperature measurement unit configured to measure temperature of a cooling medium used to cool down the fuel cell; and a controller configured to provide an output limit of the fuel cell in response to a decrease of the cell voltage and determine an output limit amount for the output limit according to the temperature of the cooling medium measured by the temperature measurement unit. When the cell voltage obtained from an end-portion cell of the fuel cell is equal to or lower than a first threshold value and the cell voltage obtained from all the cells of the fuel cell is equal to or lower than a second threshold value, the controller selects a larger output limit amount between an output limit amount according to a corrected temperature that is corrected to be lower than the temperature of the cooling medium measured by the temperature measurement unit and the output limit amount according to the temperature of the cooling medium measured by the temperature measurement unit, to be used for the output limit of the fuel cell.

In the fuel cell system of this aspect, the controller provides the output limit of the fuel cell with selecting the larger output limit amount between the output limit amount according to the corrected temperature, i.e., the temperature of the end-portion cells of the fuel cell and the output limit amount according to the temperature of the cooling medium, i.e., according to the temperature of the fuel cell. As a result, this configuration readily provides the output limit of the fuel cell by using the temperature of the cooling medium while improving the startability of the fuel cell, and furthermore enhances the effect of suppressing deterioration of the cells.

(6) In the fuel cell system of the above aspect, the first threshold value may be a value determined according to the corrected temperature, and the second threshold value may be a value determined according to the temperature of the cooling medium measured by the temperature measurement unit.

In the fuel cell system of this aspect, the first threshold value used for detection of a decrease in cell voltage in the end-portion cells of the fuel cell, according to the corrected temperature, i.e., the temperature of the end-portion cells of the fuel cell. The second threshold value used for detection of a decrease in cell voltage in all the cells of the fuel cell, according to the temperature of the cooling medium, i.e., the temperature of the fuel cell. The fuel cell system of this aspect can thus determine the threshold values used for detection of a decrease in cell voltage with high precision.

The invention may be implemented by any of various aspects other than the aspects of the fuel cell system described above, for example, a control apparatus of the fuel cell system, a control method of the fuel cell system, a control apparatus of a fuel cell, a control method of a fuel cell, a computer program configured to implement any of these control methods, and a non-transitory storage medium in which the computer program is stored. An object of the fuel cell system according to one aspect of the invention is to readily provide the output limit of the fuel cell by using the temperature of the cooling medium, while improving the startability of the fuel cell. Other needs include improvement of various performances of the fuel cell system, improvement of usability, and simplification and commonalization of the control method of the fuel cell system.

DESCRIPTION OF EMBODIMENTS

A. First Embodiment

A-1. Configuration of Fuel Cell System

Figure 1:
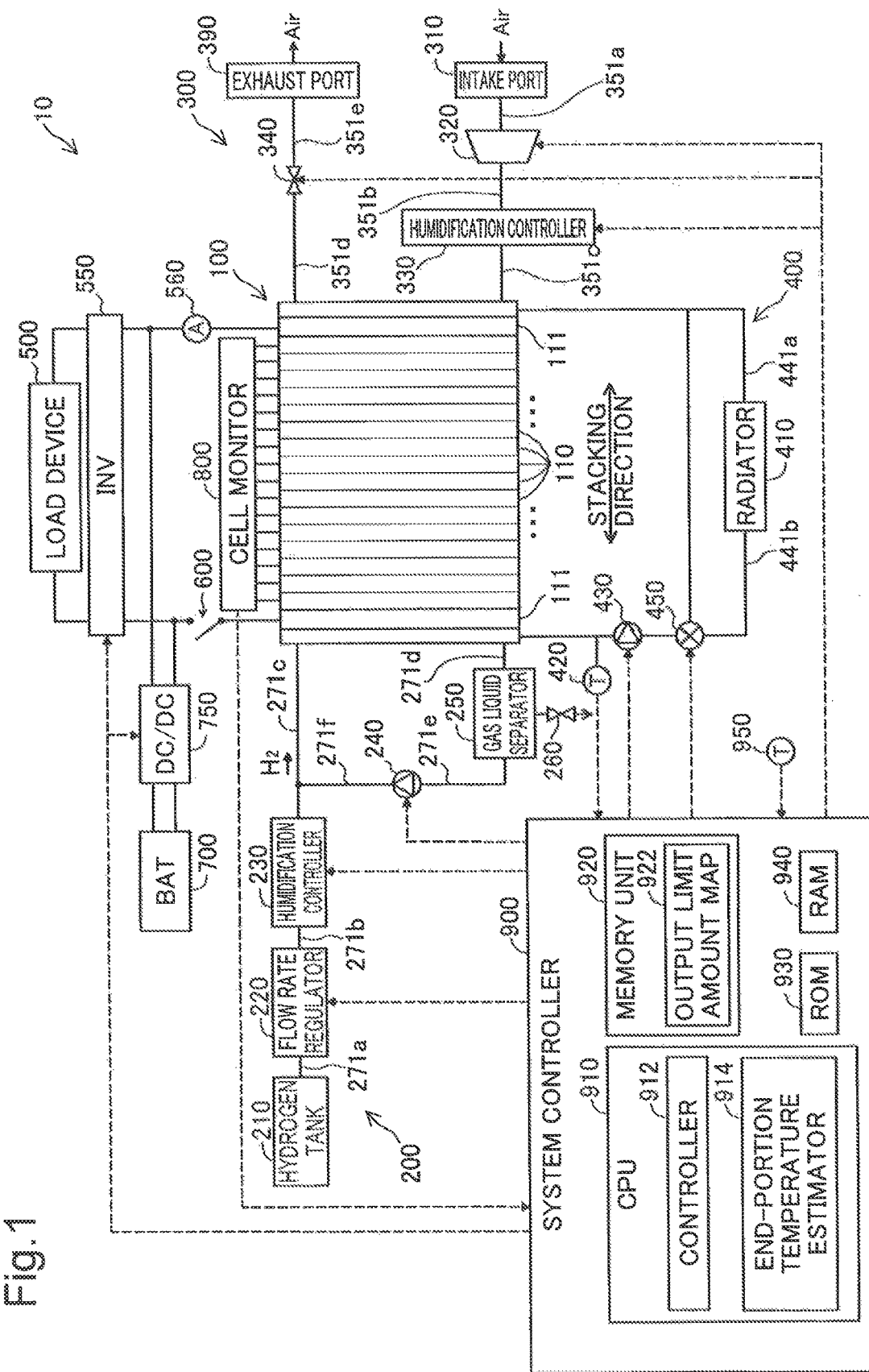
FIG. 1 is a diagram illustrating the schematic configuration of a fuel cell system according to a first embodiment of the invention.

FIG. 1 is a diagram illustrating the schematic configuration of a fuel cell system 10 according to a first embodiment of the invention. The fuel cell system 10 is mounted on, for example, an electric vehicle and is used as a system for supplying a driving power source. In the case of detection of a decrease in cell voltage in end-portion cells of a fuel cell, the fuel cell system 10 of the embodiment provides an output limit of the fuel cell with a smaller output limit amount than an output limit amount according to the temperature of a cooling medium.

The "output limit of the fuel cell" herein means that the fuel cell system 10 provides an upper limit of electric current required for the fuel cell. The "output limit amount" means the magnitude of the output limit of the fuel cell provided by the fuel cell system 10. The larger output limit amount leads to the lower upper limit of electric current required for the fuel cell by the fuel cell system 10, whereas the smaller output limit amount leads to the higher upper limit of electric current required for the fuel cell by the fuel cell system 10. The "end-portion cells" include at least end cells located at the outermost positions in the stacking direction among a plurality of cells stacked to form a stack structure and may further include one or several cells adjacent to the end cells. The "several cells" may be, for example, two or three to five or six cells or may include cells located in a range of one twentieth of the total length of all the cells in the stacking direction from the end cell located at the outermost position in the stacking direction.

The fuel cell system 10 includes a fuel cell 100, a fuel gas supply system 200, an oxidizing gas supply system 300, a fuel cell cooling system 400, a load device 500, a power supply changeover switch 600, a battery 700, a cell monitor 800 and a system controller 900.

The fuel cell 100 has a stack structure by stacking a plurality of fuel cells 110 (hereinafter may be simply referred to as "cells 110"). Each cell 110 includes an electrolyte membrane, an anode-side catalyst electrode layer (hereinafter may be simply referred to as "anode) placed on one surface of the electrolyte membrane and a cathode-side catalyst electrode layer (hereinafter may be simply referred to as "cathode") placed on the other surface of the electrolyte membrane. The embodiment employs a solid polymer electrolyte membrane for the electrolyte membrane. The embodiment also employs carbon particles with platinum (Pt) supported thereon and an electrolyte-containing catalyst for the anode-side catalyst electrode layer and the cathode-side catalyst electrode layer. The cell 110 generates electric power by electrochemical reaction of a fuel gas (for example, hydrogen) supplied to the anode-side catalyst electrode layer and an oxidizing gas (for example, oxygen included in the air) supplied to the cathode-side catalyst electrode layer. Two terminal plates 111 as total electrodes are placed on the respective ends of the stacked cells 110.

The fuel gas supply system 200 includes a hydrogen tank 210, a flow rate regulator 220, a humidification controller 230, a circulation compressor 240, a gas liquid separator 250 and a changeover valve 260. The fuel gas supply system 200 is configured to supply hydrogen as the fuel gas from the hydrogen tank 210 to the anodes of the respective cells 110 constituting the fuel cell 100. Hydrogen is supplied from the hydrogen tank 210 through a fuel gas supply flow path 271a, the flow rate regulator 220, a fuel gas supply flow path 271b, the humidification controller 230 and a fuel gas supply flow path 271c. The flow rate regulator 220 regulates the supply amount of hydrogen to achieve a flow rate and a pressure that meet an instruction from the system controller 900. The humidification controller 230 regulates the humidification temperature of hydrogen to achieve a humidity of hydrogen that meets an instruction from the system controller 900. The hydrogen tank 210 may be, for example, a hydrogen tank for storing high-pressure hydrogen equipped with a pressure regulator.

In the fuel gas supply system 200, the changeover valve 260 is opened to discharge unused hydrogen that is not used in the anodes, out of the fuel cell system 10. The unused hydrogen is discharged through a fuel gas discharge flow path 271d, the gas liquid separator 250 and the changeover valve 260. In the fuel gas supply system 200, the changeover valve 260 is closed to circulate the unused hydrogen that is not used in the anodes, to the fuel gas supply flow path 271c and reuse the unused hydrogen as the fuel gas. The unused hydrogen is reused through the fuel gas discharge flow path 271d, the gas liquid separator 250, a circulation flow path 271e, the circulation compressor 240 and a circulation flow path 271f. The circulation compressor 240 regulates the circulation amount and the pressure of hydrogen in response to an instruction from the system controller 900.

The oxidizing gas supply system 300 includes an intake port 310, a compressor 320, a humidification controller 330, a sealing valve 340 and an exhaust port 390. The oxidizing gas supply system 300 is configured to supply the air including oxygen as the oxidizing gas to the cathodes of the respective cells 110 constituting the fuel cell 100. The air is supplied from the intake port 310 through an oxidizing gas supply flow path 351a, the compressor 320, an oxidizing gas supply flow path 351b, the humidification controller 330 and an oxidizing gas supply flow path 351c. The compressor 320 regulates the amount of the air taken in from the intake port 310 to achieve a pressure that meets an instruction from the system controller 900. The humidification controller 330 regulates the humidification temperature of the air to achieve a humidity of the air that meets an instruction from the system controller 900.

The oxidizing gas supply system 300 discharges, through the exhaust port 390, an exhaust gas that is discharge from the fuel cell 100 and has the concentration reduced by oxygen used for the electrochemical reaction. The exhaust gas is discharged through an oxidizing gas discharge flow path 351d, the sealing valve 340 and an oxidizing gas discharge flow path 351e. The sealing valve 340 prevents the air from being supplied to the cathodes through the exhaust port 390, the oxidizing gas discharge flow path 351e, the sealing valve 340 and the oxidizing gas discharge flow path 351d during suspension of the fuel cell system 100. The sealing valve 340 regulates its open-close position in response to an instruction from the system controller 900 to control the supply of the air.

The fuel cell cooling system 400 includes a radiator 410, a cooling medium temperature sensor 420, a cooling medium circulation pump 430 and a rotary valve 450. The fuel cell cooling system 400 is configured to circulate a cooling medium and thereby cool down the fuel cell 100. For example, water or the air may be used as the cooling medium. This embodiment employs water as the cooling medium. The radiator 410 is connected with the fuel cell 100 via a cooling medium supply flow path 441a and a cooling medium discharge flow path 441b. The radiator 410 supplies the cooling medium through the cooling medium supply flow path 441a to the fuel cell 100 and receives the cooling medium that has been used for cooling, through the cooling medium discharge flow path 441b, so as to circulate the cooling medium. The cooling medium temperature sensor 420 measures the temperature of the cooling medium that is discharged from the fuel cell 100. The cooling medium temperature sensor 420 has an output connected to the system controller 900. The cooling medium temperature sensor 420 serves as the "temperature measurement unit". The cooling medium circulation pump 430 and the rotary valve 450 regulate the circulation amount and the pressure of the cooling medium, in response to an instruction from the system controller 900.

The load device 500 is configured by, for example, a motor for vehicle driving. The load device 500 is connected with the respective terminal plates 111 on the positive electrode side and on the negative electrode side of the fuel cell 100 via the power supply changeover switch 600. An inverter 550 is provided to convert DC current supplied from the fuel cell 100 or the battery 700 into AC current and supply the AC current to the load device 500. The inverter 550 is connected in parallel to the fuel cell 100 and the battery 700. A current sensor 560 is connected in series with the fuel cell 100 to measure the value of electric current flowing in the fuel cell 100.

The battery 700 is configured by, for example, a secondary battery. The battery 700 is connected in parallel to the load device 500 and the fuel cell 100 via a DC-DC converter 750. The DC-DC converter 750 boosts up an output voltage of the battery 700 and supplies the boosted-up voltage to the inverter 550. The DC-DC converter 750 also steps down the output voltage and supplies the stepped-down voltage to the battery 700, in order to accumulate a surplus power generated by the fuel cell 100. In the fuel cell system 10 of the embodiment, at OFF (open) position of the power supply changeover switch 600, the battery 700 is connected with the load device 500 via the DC-DC converter 750 and the inverter 550. At ON (closed) position of the power supply changeover switch 600, on the other hand, the fuel cell 100 is connected with the load device 500.

The cell monitor 800 is connected with the respective cells 110 constituting the fuel cell 100 to measure the cell voltages of the respective cells 110. The cell voltage means a potential difference between the cathode electrode and the anode electrode. The cell monitor 800 of this embodiment is connected with all the cells 110 constituting the fuel cell 100 to individually measure the cell voltages of the respective cells 110. According to a modification, however, the cell monitor 800 may be connected with only part of the cells 110 constituting the fuel cell 100 to measure the cell voltages of the part of the cells 110. The cell monitor 800 has an output connected to the system controller 900.

The system controller 900 includes a CPU (central processing unit) 910, a memory unit 920, a ROM (read only memory) 930, a RAM (random access memory) 940 and an ambient temperature sensor 950 that is configured to measure the ambient temperature. The system controller 900 is electrically connected with the respective components of the fuel cell system 10 to control the respective components based on information received from the respective components.

The CPU 910 reads and executes a control program stored in the ROM 930 to control the operations of the respective components of the fuel cell system 10 and serves as a controller 912 and an end-portion temperature estimator 914. The memory unit 920 is configured by, for example, a ROM, a RAM or a hard disk. The memory unit 920 stores in advance an output limit amount map 922.

The controller 912 provides an upper limit of the electric current required for the fuel cell 100 and thereby provides an output limit of the fuel cell 100. A shortage of electric power caused by the output limit of the fuel cell 100 provided by the controller 912 is supplemented by, for example, the battery 700. The controller 912 performs an output limit amount determination process described later to determine the magnitude of the output limit (output limit amount) of the fuel cell 100 provided by the controller 912. The end-portion temperature estimator 914 estimates the temperature of the end-portion cell 110 of the fuel cell 100 in the output limit amount determination process.

Figure 2:
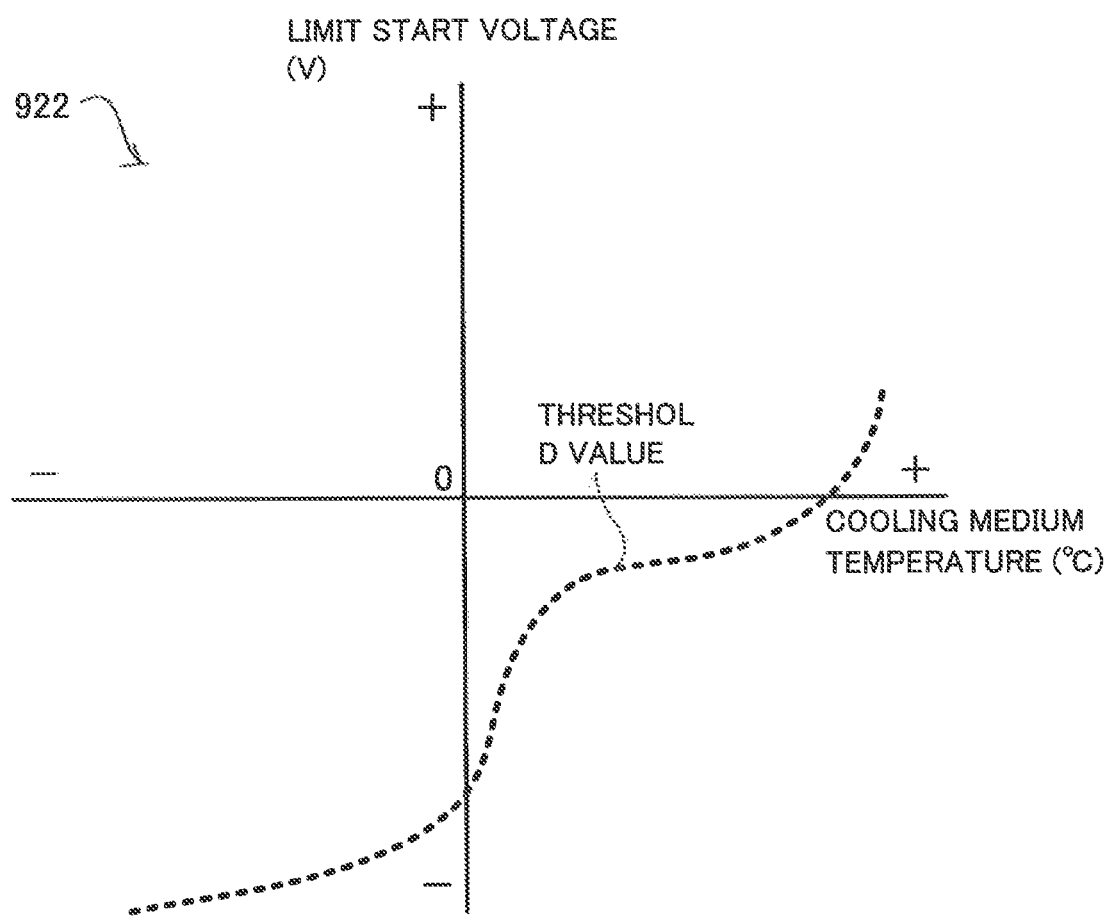
FIG. 2 is a diagram illustrating one example of an output limit amount map.

FIG. 2 is a diagram illustrating one example of the output limit amount map 922. The output limit amount map 922 stores a variation in threshold value (shown by a broken line curve in FIG. 2) defined by limit start voltage (V) and temperature (° C.). The limit start voltage means a voltage at which the controller 912 is to start providing the output limit of the fuel cell 100. The cell 110 is more likely to deteriorate by the decrease of the cell voltage at the higher temperature of the cell 110. The threshold value (shown by the broken line curve) of the output limit amount map 922 is accordingly determined such that the limit start voltage and the temperature have a positive correlation. The output limit amount map 922 shown in FIG. 2 is only illustrative, and the concrete values of the voltage, the temperature and the threshold value may be changed appropriately.

A-2. Output Limit Amount Determination Process

Figure 3:
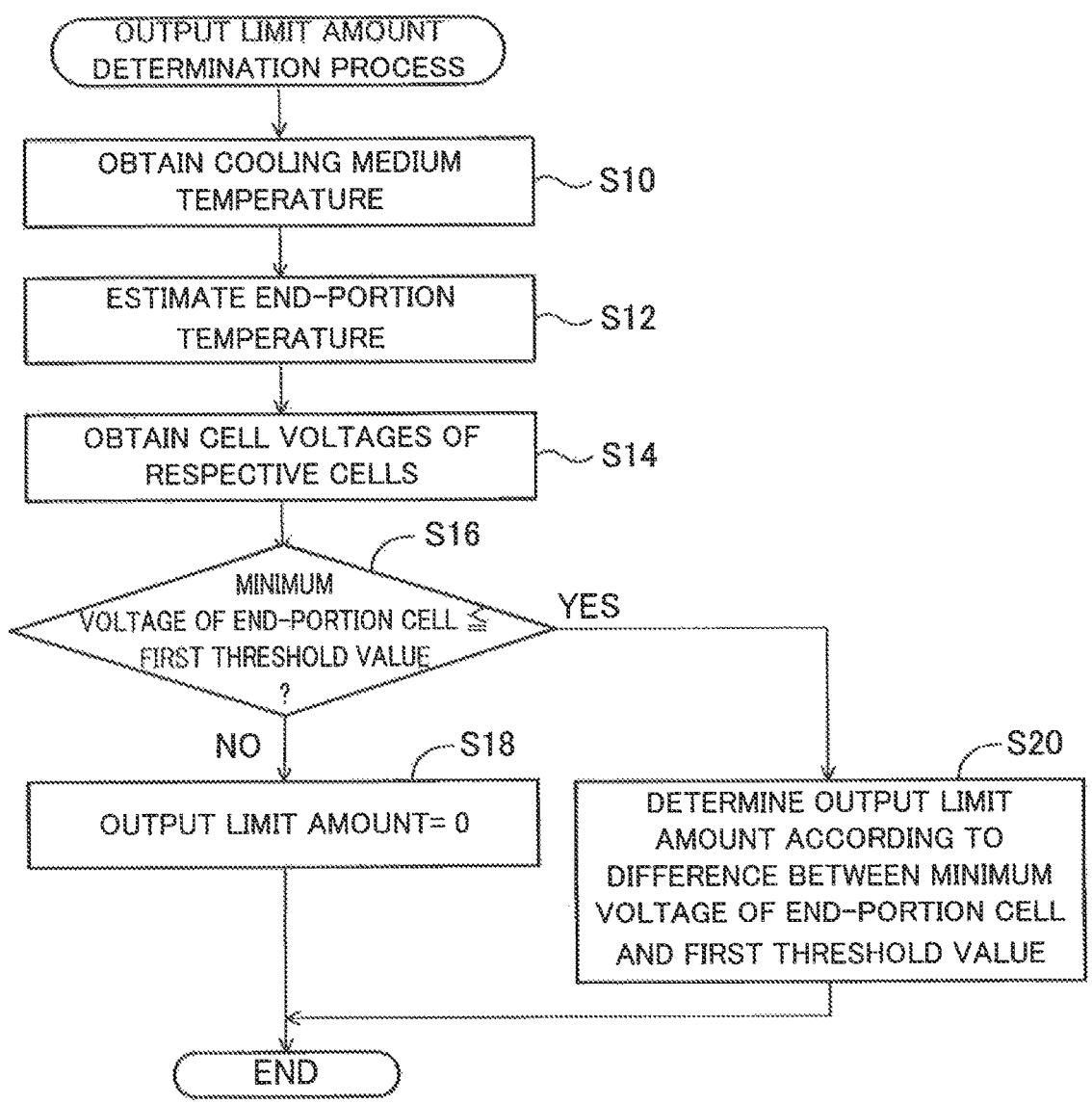
FIG. 3 is a flowchart showing a procedure of output limit amount determination process.

FIG. 3 is a flowchart showing a procedure of output limit amount determination process. The output limit amount determination process is performed by cooperation of the controller 912 and the end-portion temperature estimator 914. The output limit amount determination process is repeatedly performed at predetermined time intervals after a start of the fuel cell system 10. The predetermined time interval may be determined appropriately.

At step S10, the controller 912 obtains a cooling medium temperature. More specifically, the controller 912 obtains, from the cooling medium temperature sensor 420, the latest temperature of the cooling medium measured by the cooling medium temperature sensor 420 and specifies the obtained latest temperature as the cooling medium temperature. The temperature of the cooling medium obtained by the cooling medium temperature sensor 420 is the temperature of the cooling medium that is discharged from the fuel cell 100. Accordingly, the cooling medium temperature is equivalent to the average temperature of the plurality of cells 110 constituting the fuel cell 100.

At step S12, the end-portion temperature estimator 914 estimates an end-portion temperature. The "end-portion temperature" means the temperature of the end-portion cell 110 of the fuel cell 100. More specifically, the end-portion temperature estimator 914 applies a primary delay filter to the cooling medium temperature obtained at step S10 and specifies the resulting temperature as the end-portion temperature. The end-portion temperature serves as the "corrected temperature".

Figure 4:
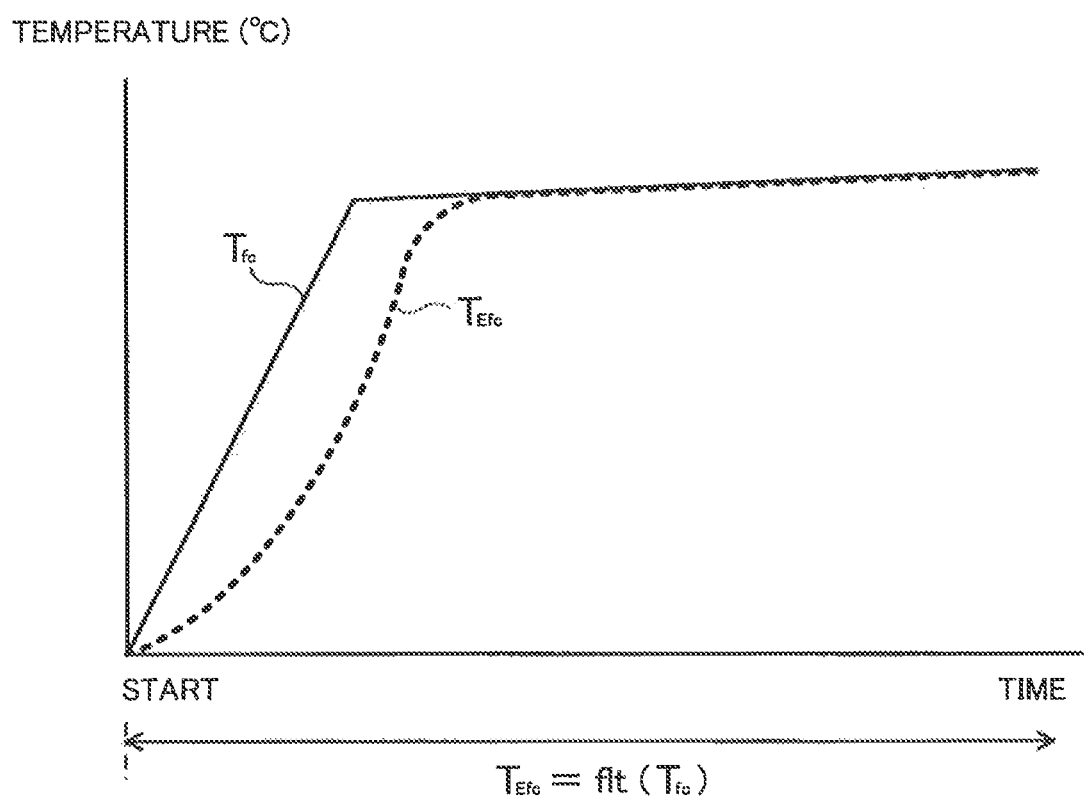
FIG. 4 is a diagram illustrating a method of estimating an end-portion temperature.

FIG. 4 is a diagram illustrating a method of estimating the end-portion temperature. As described above with regard to step S12 of FIG. 3, the end-portion temperature estimator 914 applies a primary delay filter fit to a cooling medium temperature $T_{fc}$ to determine an end-portion temperature $T_{Efc}$ according to Equation (1) given below.

$$T_{Efc} = flt(T_{fc}) \quad (1)$$

FIG. 4 shows time changes of the cooling medium temperature $T_{fc}$ obtained at step S10 and the end-portion temperature $T_{Efc}$ estimated at step S12. In FIG. 4, a solid-line curve shows a time change of the cooling medium temperature $T_{fc}$, and a broken-line curve shows a time change of the end-portion temperature $T_{Efc}$. As illustrated, application of the primary delay filter causes the end-portion temperature $T_{Efc}$ to be lower than the cooling medium temperature $T_{fc}$ over a certain time period after a start of the fuel cell system 10. In general, in the fuel cell 100, the end-portion cells 110 are more likely to release heat and have the poorer temperature rise performance, so as to have the lower temperature, compared with center-portion cells 110 that are located in a center portion of the stack structure. At step S12 in the output limit amount determination process (shown in FIG. 3), the end-portion temperature estimator 914 provides the end-portion temperature $T_{Efc}$ as the corrected value approximate to the actual state.

At step S14 of FIG. 3, the controller 912 obtains the cell voltages of the respective cells 110. More specifically, the controller 912 obtains the latest cell voltages of the respective cells 110 measured by the cell monitor 800.

At step S16, the controller 912 determines whether a minimum voltage of the end-portion cell is equal to or lower than a first threshold value. More specifically, the controller 912 performs the following steps a1 to a4.

(a1) The controller 912 extracts the cell voltages of the end-portion cells 110 of the fuel cell 100 from the cell voltages of the respective cells 110 obtained at step S14.

(a2) The controller 912 extracts a minimum cell voltage from the cell voltages extracted at step a1, as "minimum voltage of the end-portion cell".

(a3) The controller 912 determines the first threshold value. More specifically, the controller 912 refers to the output limit amount map 922 and determines a limit start voltage corresponding to the end-portion temperature $T_{Efc}$ estimated at step S12, as the first threshold value. In other words, the first threshold value is determined according to the end-portion temperature $T_{Efc}$.

(a4) The controller 912 determines whether the minimum voltage of the end-portion cell determined at step a2 is equal to or lower than the first threshold value (limit start voltage corresponding to the end-portion temperature) determined at step a3.

When the minimum voltage of the end-portion cell is higher than the first threshold value (step S16: NO), the controller 912 determines not to provide the output limit of the fuel cell 100 (i.e., sets the output limit amount=0) at step S18 and terminates the output limit amount determination process.

When the minimum voltage of the end-portion cell is equal to or lower than the first threshold value (step S16: YES), on the other hand, the controller 912 determines the output limit amount of the fuel cell 100 according to a difference between the minimum voltage of the end-portion cell (step a2) and the limit start voltage determined as the first threshold value (step a3) at step S20. The controller 912 may employ any suitable method to determine the output limit amount. For example, the controller 912 may use a map provided in advance in the memory unit 920 or may use a predetermined calculation formula. After determining the output limit amount, the controller 912 terminates the output limit amount determination process and provides an upper limit based on the output limit amount with regard to the electric current required for the fuel cell 100.

As described above, in the output limit amount determination process of the embodiment, the controller 912 determines the first threshold value according to the end-portion temperature that is corrected to be lower than the cooling medium temperature (step S12) (step S16, step a3). In the output limit amount map 922 (shown in FIG. 2), the limit start voltage and the temperature have a positive correlation, so that the limit start voltage determined as the first threshold value is lower than a limit start voltage determined according to the cooling medium temperature. As a result, the difference between the minimum voltage of the end-portion cell and the limit start voltage determined as the first threshold value (step S20) is smaller than the difference between the minimum value of the end-portion cell and the limit start voltage determined according to the cooling medium temperature. The controller 912 determines the output limit amount according to the difference corrected to be smaller than the difference based on the output limit amount according to the cooling medium temperature (step S20) as described above. In the output limit amount determination process of this embodiment, in the case of detection of a decrease in cell voltage in the end-portion cells 110 of the fuel cell 100, the controller 912 accordingly provides the output limit of the fuel cell 100 with the smaller output limit amount than the output limit amount according to the cooling medium temperature.

According to the embodiment, the controller 912 compares the minimum voltage of the end-portion cell with the first threshold value at step S16. According to a modification, the controller 912 may compare a statistical value of the cell voltages of the end-portion cells (for example, an average value, a median value or a mode value) with the first threshold value at step S16. According to another modification, the controller 912 may compare the respective cell voltages of the end-portion cells with the first threshold value. In the latter modification, the controller 912 may determine that the condition of step S16 is satisfied when the cell voltage in any of the end-portion cells becomes equal to or lower than the first threshold value, or may determine that the condition of step S16 is satisfied when the cell voltages in n end-portion cells (where n represents an integral value of not less than 2) become equal to or lower than the first threshold value.

The output limit amount of the fuel cell 100 has a positive correlation to the temperature of the fuel cell 100. More specifically, the higher temperature of the fuel cell 100 provides the larger output limit amount, and the lower temperature of the fuel cell 100 provides the smaller output limit amount. In the fuel cell 100 having the plurality of cells 110 like this embodiment, the temperatures of the respective cells 110 of the fuel cell 100 are not uniform. For example, the temperature in the end-portion cells 110 of the fuel cell 100 is lower than the temperature in the center-portion cells 110 of the fuel cell 100. The temperature of the cooling medium (cooling medium temperature $T_{fc}$) generally used as an index indicating the temperature of the fuel cell 100 is accordingly higher than the actual temperature of the end-portion cells 110 of the fuel cell 100 (end-portion temperature $T_{Efc}$). Determining the output limit amount of the fuel cell 100 according to the temperature of the cooling medium thus results in providing an excessive output limit for the end-portion cells 110 of the fuel cell 100 (i.e., providing an excessively large output limit amount). The excessive output limit is likely to reduce the amount of heat generated by the respective cells 110 of the fuel cell 100 and cause deterioration of the startability of the fuel cell 100.

In the fuel cell system 10 of the embodiment, when the cell voltage obtained from the end-portion cells 110 of the fuel cell 100 is decreased (step S16: YES in FIG. 3), the controller 12 reduces the output limit amount used for the actual output limit of the fuel cell 100 to be smaller than the output limit amount according to the temperature of the cooling medium (cooling medium temperature $T_{fc}$) measured by the temperature measurement unit (cooling medium temperature sensor 420) (step S20 in FIG. 3). The fuel cell system 10 of the embodiment accordingly prevents an excessive output limit from being provided for the end-portion cells 110 of the fuel cell 100. This increases the amount of heat generated by the respective cells 110 of the fuel cell 100 and improves the startability of the fuel cell 100. As a result, the fuel cell system 10 of the embodiment readily provides the output limit of the fuel cell 100 by using the temperature of the cooling medium, while improving the startability of the fuel cell 100.

In the fuel cell system 10 of the embodiment, the controller 912 determines the output limit amount of the fuel cell 100, based on the corrected temperature (end-portion temperature $T_{Efc}$) that is corrected to fit the temperatures of the end-portion cells 110 of the fuel cell 100 (step S20 in FIG. 3).

Additionally, in the fuel cell system 10 of the embodiment, the controller 912 applies the primary delay filter fit to determine the corrected temperature (end-portion temperature $T_{Efc}$) (step S12 in FIG. 3). The corrected temperature is accordingly lower than the temperature of the cooling medium (cooling medium temperature $T_{fc}$) measured by the temperature measurement unit (cooling medium temperature sensor 420) for some time after a start of the fuel cell 100 and subsequently becomes closer to the temperature of the cooling medium measured by the temperature measurement unit (as shown in FIG. 4). As a result, the controller 912 gives priority to increasing the amount of heat generated by the respective cells 110 of the fuel cell 100 and thereby improving the startability of the fuel cell 100 for some time after a start of the fuel cell 100 (for example, for some time until warm-up of the fuel cell 100), and after that (for example, after warm-up of the fuel cell 100), gives priority to suppressing deterioration of the cells 110. The cell 110 is more likely to deteriorate by the decrease of the cell voltage at the higher temperature of the cell 110. Like the configuration of the embodiment described above, it is preferable to give priority to the effect of improving the startability of the fuel cell 100 by providing the smaller output limit amount over the effect of suppressing deterioration of the cells 110 by providing the larger output limit amount immediately after a start of the fuel cell 100 when the temperature of the cell 110 is low.

A-3. Modification of Method of Estimating End-Portion Temperature

Figure 5:
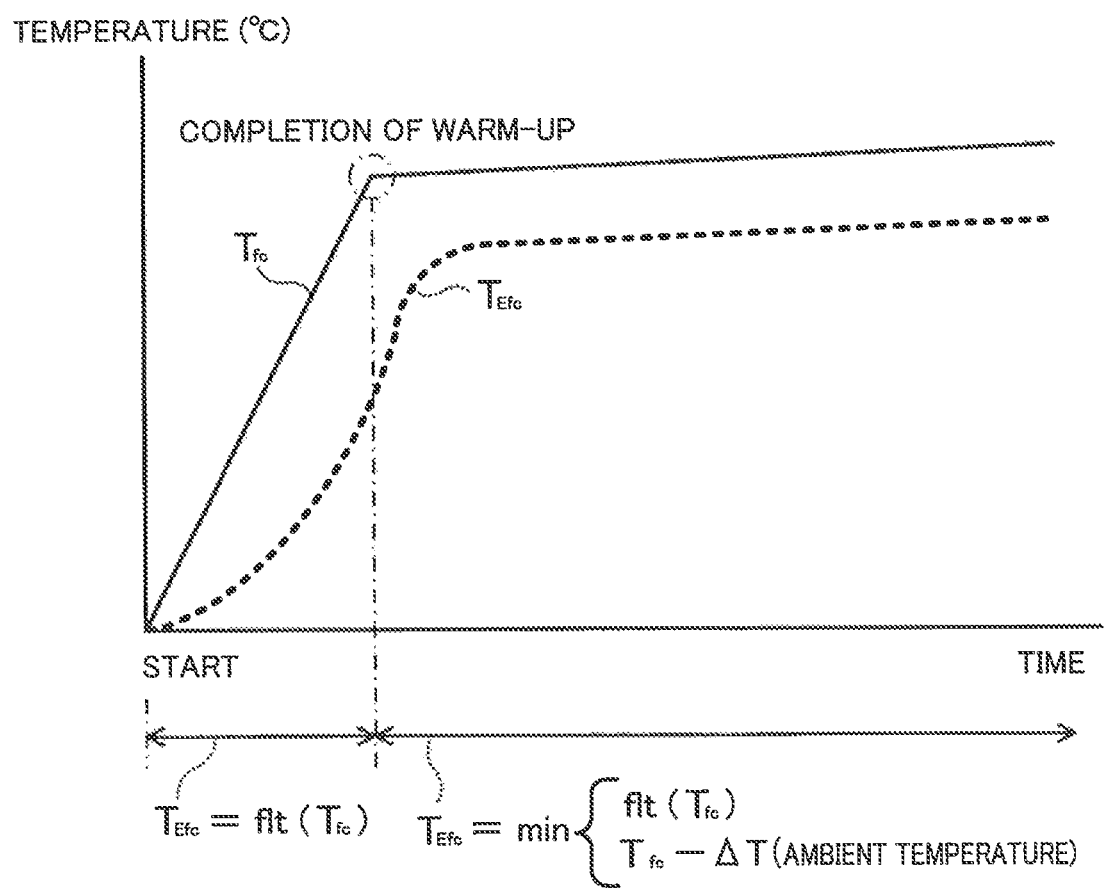
FIG. 5 is a diagram illustrating a modification of the method of estimating the end-portion temperature.

FIG. 5 is a diagram illustrating a modification of the method of estimating the end-portion temperature. The output limit amount determination process of FIG. 3 may employ the following steps b1 to b3, instead of the procedure described above for estimation of the end-portion temperature (step S12).

(b1) The end-portion temperature estimator 914 determines whether the fuel cell system 10 is being warmed up. More specifically, the end-portion temperature estimator 914 determines that the fuel cell system 10 is being warmed up when the cooling medium temperature obtained at step S10 is equal to or lower than a predetermined target temperature, while determining that warm-up of the fuel cell system 10 is completed (i.e., that the fuel cell system 10 is not being warmed up) when the cooling medium temperature is higher than the predetermined target temperature. The predetermined target temperature is specified in advance and is stored in the memory unit 920. The predetermined target temperature may be varied, for example, according to the ambient temperature.

(b2) When the fuel cell system 10 is being warmed up, the end-portion temperature estimator 914 applies the primary delay filter fit to the cooling medium temperature $T_{fc}$ obtained at step S10 and determines the resulting value, i.e., the value determined by Equation (1) described above with regard to step S12 of FIG. 3, as the end-portion temperature $T_{Efc}$.

(b3) When warm-up of the fuel cell system 10 is completed, the end-portion temperature estimator 914 subtracts a predetermined offset value ΔT that is determined according to the ambient temperature, from the cooling medium temperature $T_{fc}$ obtained at step S10 according to Equation (2) given below. The predetermined offset value ΔT is specified in advance according to the ambient temperature and is stored in the memory unit 920.

$$T_{fc} \cdot \Delta T(\text{ambient temperature}) \qquad (2)$$

The end-portion temperature estimator 914 subsequently compares the value obtained by applying the primary delay filter fit to the cooling medium temperature $T_{fc}$ (right term of Equation (1)) with the value obtained by subtracting the predetermined offset value ΔT from the cooling medium temperature $T_{fc}$ and sets the smaller to the end-portion temperature $T_{Efc}$.

FIG. 5 shows time changes of the cooling medium temperature $T_{fc}$ obtained at step S10 and the end-portion temperature $T_{Efc}$ estimated at step S12 of the modification. As illustrated, prior to completion of warm-up shown by a one dot-chain line circle, the end-portion temperature $T_{Efc}$ obtained by applying the primary delay filter is lower than the cooling medium temperature $T_{fc}$. After completion of warm-up, the smaller between the result of application of the primary delay filter and the result of subtraction of the offset value according to the ambient temperature is set as the corrected temperature (i.e., the larger amount of correction is provided). This causes the end-portion temperature $T_{Efc}$ to be lower than the cooling medium temperature $T_{fc}$.

As described above, in the fuel cell system 10 of this modification, the controller 912 applies the primary delay filter fit to determine the corrected temperature (end-portion temperature $T_{Efc}$) while the fuel cell system 10 is being warmed up. This gives priority to increasing the amount of heat generated by the respective cells 110 of the fuel cell 100 and thereby improving the startability of the fuel cell 100 while the fuel cell system 10 is being warmed up. After completion of warm-up of the fuel cell system 10, the controller 912 determines the corrected temperature by selecting the smaller between the result of application of the primary delay filter fit and the result of subtraction of the predetermined offset value ΔT according to the ambient temperature (i.e., selecting the result providing the larger amount of correction). This modified configuration suppresses deterioration of the cells 110, while improving the startability of the fuel cell 100 as much as possible by taking into account the ambient temperature, after completion of warm-up of the fuel cell system 10.

B. Second Embodiment

The following describes a configuration of a second embodiment of the invention involved in a different procedure of the output limit amount determination process. The configuration and the procedure of the second embodiment similar to the configuration and the procedure of the first embodiment are expressed by the like reference signs to those of the first embodiment and are not specifically described. In other words, the configuration and the procedure that are not described below are identical with those of the first embodiment described above.

B-1. Configuration of Fuel Cell System

Figure 6:
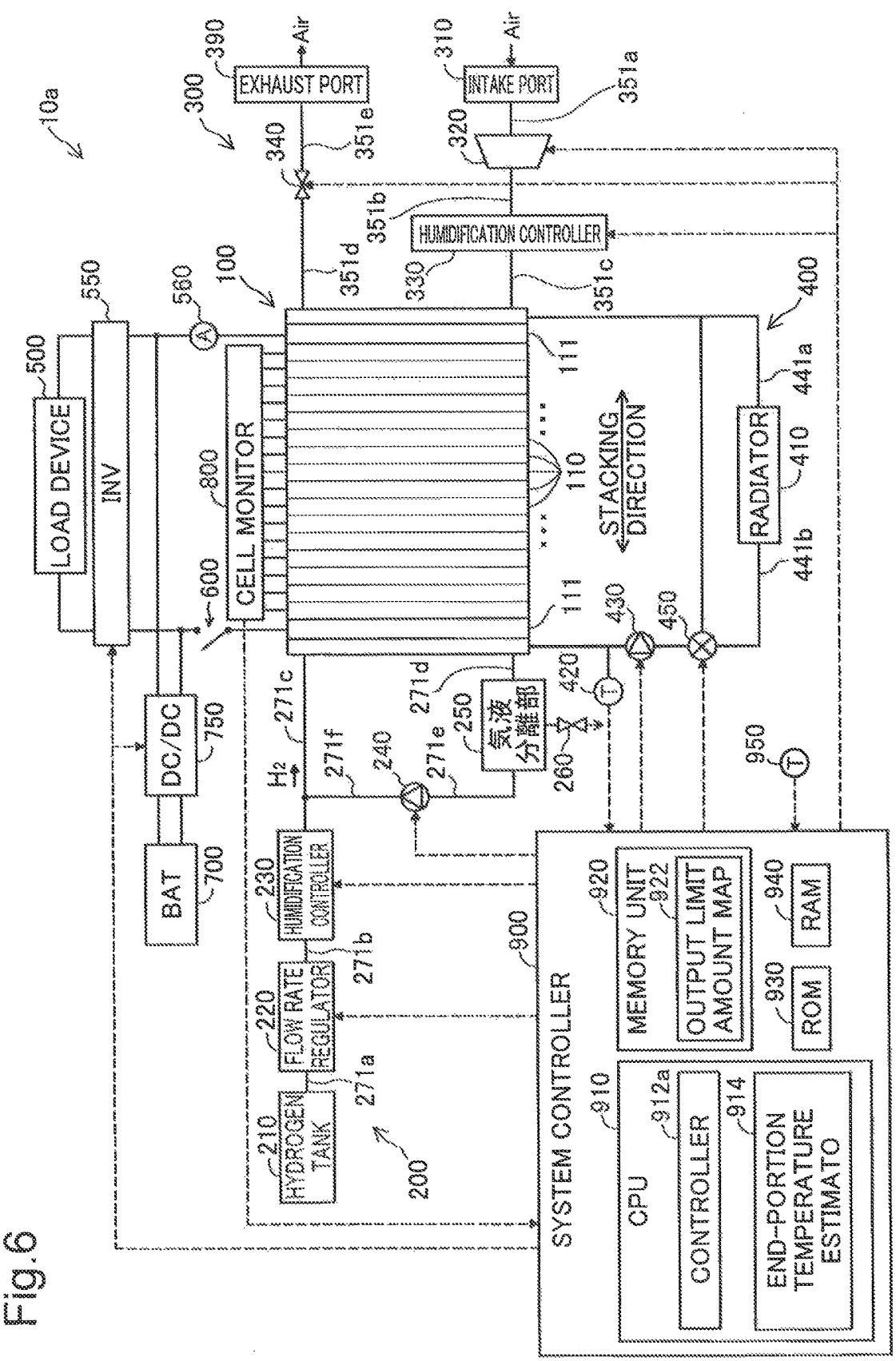
FIG. 6 is a diagram illustrating the schematic configuration of a fuel cell system according to a second embodiment.

FIG. 6 is a diagram illustrating the schematic configuration of a fuel cell system 10a according to the second embodiment. The difference from the first embodiment shown in FIG. 1 is that the fuel cell system 10a includes a controller 912a in place of the controller 912. The controller 912a performs a different procedure of the output limit amount determination process from that of the first embodiment.

B-2. Output Limit Amount Determination Process

Figure 7:
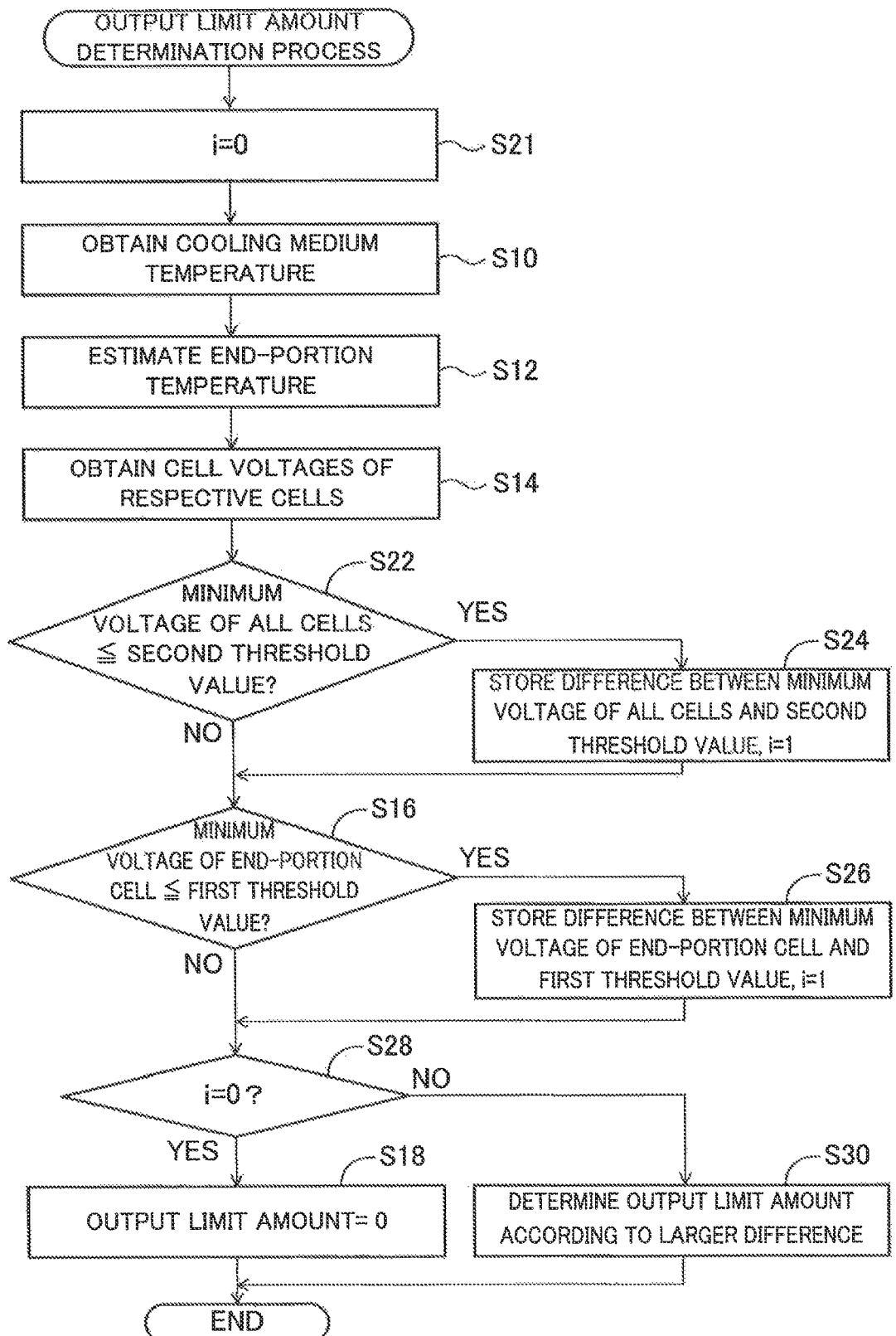
FIG. 7 is a flowchart showing a procedure of output limit amount determination process according to the second embodiment.

FIG. 7 is a flowchart showing a procedure of the output limit amount determination process according to the second embodiment. The difference from the first embodiment shown in FIG. 3 includes providing step S26 instead of step S22 and additionally providing steps S21, S22, S24, S28 and S30.

When the output limit amount determination process is triggered, the controller 912a initializes a variable i used for this procedure by setting 0 to the variable i at step S21. The processing of steps S10 to S14 is identical with that of the first embodiment described above with reference to FIG. 3.

At step S22, the controller 912a determines whether a minimum voltage of all the cells is equal to or lower than a second threshold value. More specifically, the controller 912a performs the following steps c1 to c3.

(c1) The controller 912a extracts a minimum cell voltage among the cell voltages of the respective cells 110 obtained at step S14, as "minimum voltage of all the cells". The extracted cell voltage as the minimum voltage of all the cells may be a cell voltage of the end-portion cell 110 or may be a cell voltage of the center-portion cell 110.

(c2) The controller 912a determines the second threshold value. More specifically, the controller 912a refers to the output limit amount map 922 and determines a limit start voltage corresponding to the cooling medium temperature $T_{fc}$ obtained at step S10, as the second threshold value. In other words, the second threshold value is determined according to the cooling medium temperature $T_{fc}$.

(c3) The controller 912a determines whether the minimum voltage of all the cells determined at step c1 is equal to or lower than the second threshold value (limit start voltage corresponding to the cooling medium temperature) determined at step c2.

When the minimum voltage of all the cells is higher than the second threshold value (step S22: NO), the controller 912a proceeds to step S16. When the minimum voltage of all the cells is equal to or lower than the second threshold value (step S22: YES), on the other hand, the controller 912a stores a difference between the minimum voltage of all the cells (step c1) and the limit start voltage determined as the second threshold value (step c2) into the RAM 940 or the memory unit 920 at step S24. The controller 912a additionally sets the variable 1 to value 1 at step S24 and proceeds to step S16.

At step S16, the controller 912a determines whether the minimum voltage of the end-portion cell is equal to or lower than the limit start voltage determined as the first threshold value. The details of step S16 in FIG. 7 are identical with those of step S16 shown in FIG. 3.

When the minimum voltage of the end-portion cell is higher than the first threshold value (step S16: NO), the controller 912a proceeds to step S28. When the minimum voltage of the end-portion cell is equal to or lower than the first threshold value (step S16: YES), on the other hand, the controller 912a stores a difference between the minimum voltage of the end-portion cell (step a2) and the limit start voltage determined as the first threshold value (step a3) into the RAM 940 or the memory unit 920 at step S26. The controller 912a additionally sets the variable 1 to value 1 at step S26 and proceeds to step S28.

At step S28, the controller 912 determines whether the variable i is equal to 0.

When the variable i is equal to 0 (step S28: YES), the controller 912a determines not to provide the output limit of the fuel cell 100 (i.e., sets the output limit amount=0) at step S18 and terminates the output limit amount determination process.

When the variable i is not equal to 0 (step S28: NO), on the other hand, at step S30, the controller 912a obtains the larger value between the difference stored at step S24 and the difference stored at step S26. In the case where only one difference is stored in the RAM 940 or the like the controller 912a obtains the stored difference. The controller 912a determines the output limit amount of the fuel cell 100 according to the obtained difference at step S30. After determining the output limit amount, the controller 912a terminates the output limit amount determination process and provides an upper limit based on the output limit amount with regard to the electric current required for the fuel cell 100 by the system controller 900.

Like the first embodiment, the controller 912a may compare a statistical value of the cell voltages of the end-portion cells with the first threshold value or may compare the respective cell voltages of the end-portion cells with the first threshold value at step S16. Similarly the controller 912a may compare a statistical value of the cell voltages of all the cells with the second threshold value or may compare the respective cell voltages of all the cells with the second threshold value at step S22.

B-3. Modification of Method of Estimating End-Portion Temperature

The output limit amount determination process of the second embodiment may employ steps b1 to b3 described above with reference to FIG. 5 for estimation of the end-portion temperature (step S12).

As described above, in the fuel cell system 10a of the embodiment, the controller 912a selects the larger output limit amount between the output limit amount according to the corrected temperature (end-portion temperature $T_{Efc}$), i.e., the temperature of the end-portion cells 110 of the fuel cell 100 and the output limit amount according to the temperature of the cooling medium (cooling medium temperature $T_{fc}$), i.e., according to the temperature of the fuel cell 100 (step S30 in FIG. 7) for the output limit of the fuel cell 100. As a result, the fuel cell system 10a of the embodiment readily provides the output limit of the fuel cell 100 by using the temperature of the cooling medium while improving the startability of the fuel cell 100, and furthermore enhances the effect of suppressing deterioration of the cells 110.

Additionally, the fuel cell system 10a of the embodiment determines the first threshold value used for detection of a decrease in cell voltage in the end-portion cells 110 of the fuel cell 100, according to the corrected temperature (end-portion temperature $T_{Efc}$), i.e., the temperature of the end-portion cells 110 of the fuel cell 100. The fuel cell system 10a of the embodiment determines the second threshold value used for detection of a decrease in cell voltage in all the cells 110 of the fuel cell 100, according to the temperature of the cooling medium (cooling medium temperature $T_{fc}$), i.e., according to the temperature of the fuel cell 100 (step S30 in FIG. 7) for the output limit of the fuel cell 100. The fuel cell system 10a of the embodiment can thus determine the threshold values used for detection of a decrease in cell voltage with high precision.

C. Modifications

The invention is not limited to any of the embodiments and the examples described above but may be implemented by a diversity of other configurations without departing from the scope of the invention. For example, part or entirety of the functions and processes implemented by software in the foregoing embodiment may be implemented by hardware. Also, part or entirety of the functions and processes implemented by hardware may be implemented by software. As the hardware, for example, various types of circuitry such as integrated circuits, discrete circuits or circuit modules in combination of those circuits may be used. Further, such modifications as described below are implementable. Some examples of possible modification are given below.

Modification 1

The above embodiments show examples of the configuration of the fuel cell system. The configuration of the fuel cell system may, however, be modified, changed and altered in any of various ways by, for example, addition, omission and replacement of components.

For example, the fuel cell is not limited to the polymer electrolyte fuel cell but may be any of various other types of fuel cells.

Modification 2

The above embodiments describe examples of the output limit amount determination process. The procedures of the output limit amount determination process shown in FIGS. 3 and 7 are only illustrative and may be modified and changed in any of various ways. For example, part of the steps may be omitted or different steps may be added. The execution sequence of the steps may be changed.

The means employed for estimation of the end-portion temperature (for example, the primary delay filter or the offset value according to the ambient temperature) are only illustrative, and the end-portion temperature estimator may employ other means. For example, the end-portion temperature estimator may use a fixed offset value to estimate the end-portion temperature or may use an offset value according to a time elapsed since a start of the fuel cell system to estimate the end-portion temperature.

The above embodiment does not discriminate between the cell voltage and the end-portion temperature in the end-portion cells at one end of the fuel cell and the cell voltage and the end-portion temperature in the end-portion cells at the other end of the fuel cell. The end-portion temperature estimator may discriminate between one end and the other end of the fuel cell and estimate the end-portion temperatures at the respective ends. Similarly the controller may discriminate between one end and the other end of the fuel cell and obtain the cell voltages of the respective ends to perform the control procedure of FIG. 3 or FIG. 7.

Modification 3

The invention is not limited to any of the embodiments, the examples and the modifications described above but may be implemented by a diversity of other configurations without departing from the scope of the invention. For example, the technical features of any of the embodiments, the examples and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

What is claimed is:
1. A fuel cell system, comprising:
a fuel cell comprising a stack structure configured by stacking a plurality of cells, the fuel cell including an end-portion cell in an end portion of the stack structure in a stacking direction;
a cell monitor configured to measure voltage of each of the cells as a cell voltage;
a temperature sensor configured to measure temperature of a cooling medium used to cool down the fuel cell; and
a controller configured to provide an output electric current limit of the fuel cell, wherein:
in response to a decrease of the cell voltage, the controller is configured to determine a first output limit amount for the output electric current limit according to the temperature of the cooling medium measured by the temperature sensor, and
when the cell voltage obtained from the end-portion cell of the fuel cell is equal to or lower than a first threshold value, the controller is configured to set the output electric current limit in accordance with a second output limit amount that is smaller than the first output limit amount.

2. The fuel cell system according to claim 1, wherein the controller is configured to determine the second output limit amount according to a corrected temperature that is corrected to be lower than the temperature of the cooling medium measured by the temperature sensor.

3. The fuel cell system according to claim 2, wherein the controller applies a primary delay element to correct the temperature.

4. The fuel cell system according to claim 2, wherein the controller applies a primary delay element to correct the temperature when the fuel cell system is being warmed up, and
after completion of warm-up of the fuel cell system, the controller selects a value that provides a larger amount of correction between a value by application of the primary delay element and a value determined according to an ambient temperature, to correct the temperature.

5. A fuel cell system, comprising:
a fuel cell comprising a stack structure configured by stacking a plurality of cells, the fuel cell including an end-portion cell in an end portion of the stack structure in a stacking direction;
a cell monitor configured to measure voltage of each of the cells as a cell voltage;
a temperature sensor configured to measure temperature of a cooling medium used to cool down the fuel cell; and
a controller configured to provide an output electric current limit of the fuel cell, wherein:
in response to a decrease of the cell voltage, the controller is configured to determine a first output limit amount for the output electric current limit according to the temperature of the cooling medium measured by the temperature sensor, and when the cell voltage obtained from the end-portion cell of the fuel cell is equal to or lower than a first threshold value and the cell voltage obtained from all the cells of the fuel cell is equal to or lower than a second threshold value, the controller is configured to set the output electric current limit in accordance with a second output limit amount, wherein the second output limit amount is the larger one of an output limit amount determined according to a corrected temperature that is corrected to be lower than the temperature of the cooling medium measured by the temperature sensor and the first output limit amount.

6. The fuel cell system according to claim 5,
wherein the first threshold value is a value determined according to the corrected temperature, and
the second threshold value is a value determined according to the temperature of the cooling medium measured by the temperature sensor.

7. The fuel cell system according to claim 1,
wherein when the cell voltage obtained from the end-portion cell of the fuel cell is higher than the first threshold value, the controller is configured not to provide the output electric current limit of the fuel cell.

8. The fuel cell system according to claim 5,
wherein when the cell voltage obtained from the end-portion cell of the fuel cell is higher than the first threshold value, the controller is configured not to provide the output electric current limit of the fuel cell.

\* \* \* \* \*